United States Patent Office 3,420,831
Patented Jan. 7, 1969

3,420,831
1-(3-HYDROXYPROPYL)-3 METHYL-5-PHENYL-HEXAHYDROPYRIDAZINE
William J. Houlihan, Mountain Lakes, N.J., assignor to Sandoz Inc., Hanover, N.J.
No Drawing. Filed Nov. 25, 1966, Ser. No. 596,756
U.S. Cl. 260—250    1 Claim
Int. Cl. C07d 51/04

ABSTRACT OF THE DISCLOSURE 9-methyl-7-phenyl-1,5-diazabicyclo[4.3.0]nonane useful as an anti-depressant is prepared by treating α-phenyl levulinic acid with 3-hydrazino propanol to form 2-(3-hydroxypropyl)-6-methyl-4-phenyl-4,5 dihydropyridazin (2H)-3-one, reducing the latter to form 1-(3-hydroxypropyl)-3-methyl-5-phenyl-hexahydropyridazine, and converting this compound to the desired nonane via halide synthesis and ring closure.

---

This invention relates to a novel bicyclic compound. In particular, the invention pertains to the compound 9-methyl-7-phenyl-1,5-diazabicyclo[4.3.0]nonane and a method for preparing the same. The invention also relates to intermediates which are useful in preparing the above compound and methods for preparing said intermediates.

The compound of the present invention, which may be represented structurally as follows

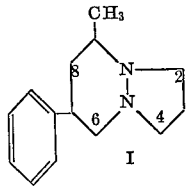

may be prepared by reacting α-phenyllevulinic acid with 3-hydrazinopropanol to form the compound 2-(3-hydroxypropyl)-6-methyl-4-phenyl-4,5-dihydropyridazin(2H)-3-one, reducing the latter to form the compound 1-(3-hydroxypropyl)-3-methyl-5-phenyl-hexahydropyridazine and then converting the latter to the desired 9-methyl-7-phenyl-1,5-diazabicyclo[4.3.0]nonane. This process is illustrated structurally as follows.

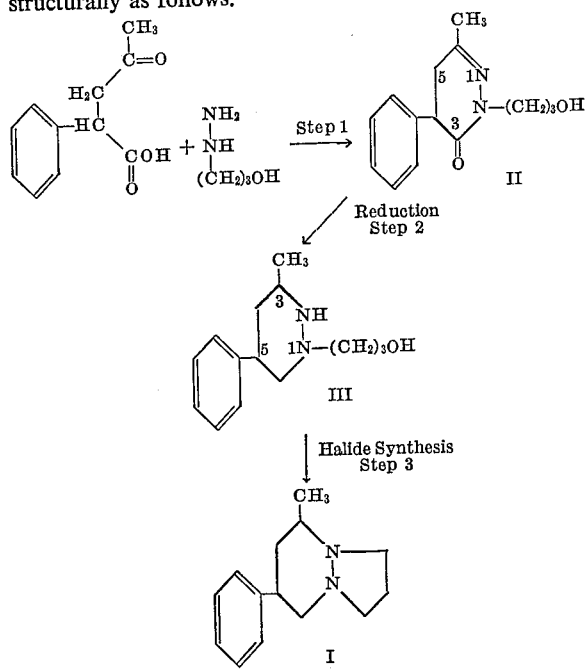

As illustrated above, Step 1 of the process involves the reaction of α-phenyllevulinic acid with 3-hydrazinopropanol to form the compound 2-(3-hydroxypropyl)-6-methyl - 4 - phenyl - 4,5 - dihydropyridazin(2H) - 3-one (II). This reaction is conveniently carried out in the presence of an inert organic solvent and at elevated temperatures. However, neither the solvent nor the temperature employed is critical. Suitable solvents include benzene, toluene, xylene and chlorobenzene. Preferably, the reaction is carried out at reflux temperature to facilitate continuous removal of water. To facilitate the formation of water, the reaction may be carried out in the presence of a catalytic amount of hydrogen ions such as by the use of an alkyl or arylsulfonic acid, e.g., methanesulfonic acid, benzene-sulfonic acid and p-toluenesulfonic acid. The resulting product (II) can be readily isolated employing conventional techniques.

The reduction (Step 2) of the pyridazinone (II) to the corresponding pyridazine (III) is readily carried out employing a hydride reducing agent, preferably an aluminum hydride, such as lithium aluminum hydride, butyl aluminum hydride, triisobutyl aluminum hydride and the like. The reduction is conveniently effected in the presence of an inert organic solvent and at an elevated temperature, preferably reflux temperature. Suitable solvents include the ethers, such as diethyl ether and tetrahydrofuran. However, neither the solvent nor temperature employed is critical. The resulting product (III) is readily recovered in conventional manner.

Step 3 of the process involves the conversion of the pyridazine (III) to the desired diazabicyclononane (I) via halide synthesis and spontaneous ring closure. This is accomplished in standard manner employing any of the conventional agents used for this purpose. The preferred agent, however, is thionyl chloride. The reaction is conveniently carried out in any suitable inert organic solvent, e.g., methylene chloride, chloroform and carbon tetrachloride, and at room temperature or elevated temperatures up to reflux temperature. Preferably, the reaction is carried out at the reflux temperature of the system. The resulting product is readily recovered in conventional manner.

The compounds of structural Formulas I and III have asymetric centers and therefore exist as geometric and optically active isomers. Separation and recovery of the respective isomers may be readily accomplished employing conventional techniques and such isomers are included within the scope of this invention.

The end compound of the present invention in its free base form (Formula I) is useful because it possesses pharmacological activity in animals. In particular, the compound is a central nervous system stimulant and can be used as an anti-depressant. For such use, the compound may be combined with a pharmaceutically acceptable carrier, and such other adjuvants, as may be necessary, and administered orally in such forms as tablets, capsules, elixirs, suspensions or solutions, or parenterally in such forms as injectable solutions, suspensions or emulsions. Furthermore, the compound may be similarly administered in the form of a non-toxic pharmaceutically acceptable acid addition salt. Such salts possess the same order of activity as the free base, are readily prepared in conventional manner by reacting the base with the appropriate acid and accordingly are included within the scope of the invention. Representative of such salts are the mineral acid salts such as the hydrochloride, hydrobromide, sulfate, phosphate and the like and the organic acid salts such as the succinate, benzoate, acetate, maleate, p-toluenesulfonate and the like.

As noted above, the compound of Formula I exists as geometric and optical isomers. In some cases greater pharmacological activity or other beneficial attribute may be found with respect to a particular isomer, and in such instances administration of such isomers may be preferred.

The dosage administered will vary depending on the mode of administration. However, in general, satisfactory results are obtained when administered at a daily dosage of from about 15 milligrams to about 30 milligrams per kilogram of animal body weight, preferably given in divided doses, 2 to 4 times a day, or in sustained release form. For both the larger mammals and smaller domestic mammals dosage forms suitable for internal administration comprise from about 100 milligrams to about 400 milligrams of the compound admixed with a solid or liquid pharmaceutical carrier or diluent.

A representative formulation is a tablet (prepared by standard tabletting techniques) and containing the following ingredients:

| Ingredients: | Parts by Wt. |
| --- | --- |
| 9-methyl-7-phenyl-1,5-diazabicyclo[4.3.0] nonane hydrochloride | 40 |
| Tragacanth | 2 |
| Lactose | 49.5 |
| Corn starch | 5 |
| Talcum | 3 |
| Magnesium stearate | 0.5 |

The following example shows representative compounds encompassed within the scope of this invention and the manner in which such compounds are prepared. However, it is to be understood that the example is for the purpose of illustration only and is not intended as in any way limiting the scope of the invention which is defined in the appended claims.

EXAMPLE 1

9-methyl-7-phervl-1,5-diazabicyclo[4.3.0]nonane

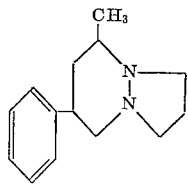

Step A.—Preparation of 2-(3-hydroxypropyl)-6-methyl-4-phenyl-4,5-dihydropyridazin(2H)-3-one To a flask equipped with a condenser, Dean-Stark tube and stirrer is added 40.0 g. of α-phenyllevulinic acid, 20.5 g. of 3-hydra-zinopropanol and 500 ml. of toluene. The mixture is stirred and refluxed until water ceases to separate in the Dean-Stark tube. The organic phase is separated and washed first with 100 ml. of 2 N hydrochloric acid, then with 100 ml. of 2 N sodium hydroxide and finally with 100 ml. of a saturated solution of sodium chloride. The washed organic phase is then evaporated in vacuo to obtain 2(3-hydroxypropyl)-6-methyl-4-phenyl-4,5-dihydropyridazin(2H)-3-one as a viscous oil.

Step B.—Preparation of 1-(3-hydroxypropyl)-3-methyl-5-phenyl-hexahydropyridazine To a flask equipped with a stirrer, condenser, gas inlet tube and Soxhlet tube containing 37 g. of 2-(3-hydroxypropyl)-6-methyl-4-phenyl - 4,5 - dihydropyridazin (2H)-3-one is added under nitrogen atmosphere 10.6 g. of lithium aluminum hydride and 200 ml. of absolute diethyl ether. The contents of the flask are stirred and refluxed for 25 hours and then cooled in an ice bath. To the cooled mixture is added dropwise 21.2 ml. of 2 N sodium hydroxide and 31.8 ml. of water. The resulting mixture is then filtered and the filtrate concentrated on a rotary evaporator to obtain 1-(3-hydroxypropyl)-3-methyl-5-phenyl-hexahydropyridazine as a viscous oil.

Step C.—Preparation of 9-methyl-7-phenyl-1,5-diazabicyclo[4.3.0]nonane

To a flask equipped with a condenser and stirrer is added 32.4 g. of 1-(3-hydroxypropyl)-3-methyl-5-phenyl-hexahydropyridazine, 400 ml. of chloroform and 24.6 g. of thionyl chloride. The resulting mixture is stirred and refluxed for 24 hours. The solution thus obtained is washed first with 10% sodium carbonate solution until the wash is alkaline and then with 100 ml. of a saturated solution of sodium chloride. The organic phase is then evaporated in vacuo to obtain crude 9-methyl-7-phenyl-1,5-diazabicyclo[4.3.0]nonane, B.P. 145–162° C./0.6–0.7 mm.

The free base is dissolved in diethyl ether, the resulting solution treated with hydrogen chloride gas and the resulting solid material filtered off to obtain 9-methyl-7-phenyl - 1,5 - diazabicyclo[4.3.0]nonane hydrochloride, 100–103° C.

What is claimed is:

1. The compound which is 1-(3-hydroxypropyl)-3-methyl-5-phenyl-hexahydropyridazine.

References Cited

UNITED STATES PATENTS 2,832,780  4/1968  King _____ 260—250

NICHOLAS S. RIZZO, Primary Examiner.

R. V. RUSH, Assistant Examiner.

U.S. Cl. X.R.

424—250